L. E. GREENE.
RAKE.
APPLICATION FILED DEC. 21, 1911.
1,020,387.
Patented Mar. 12, 1912.
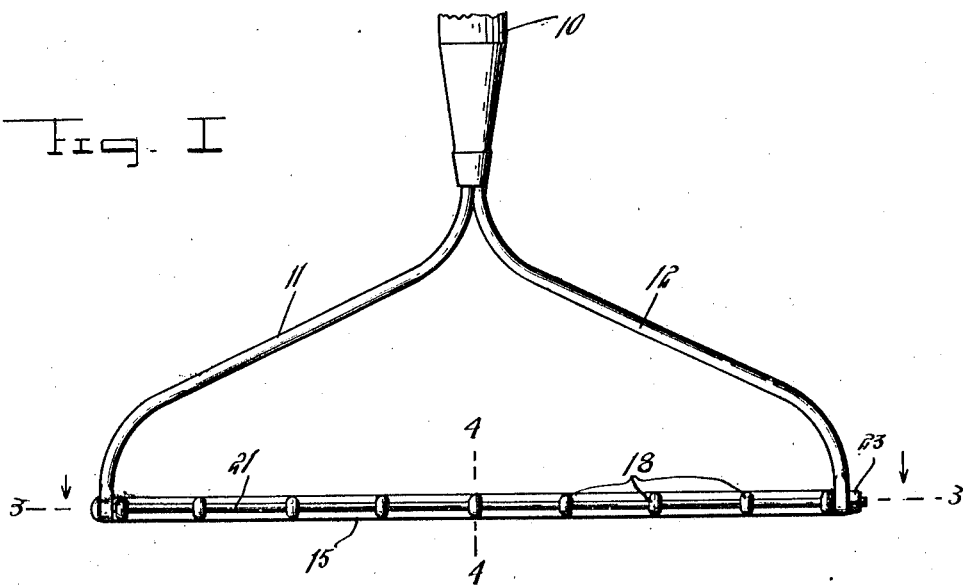
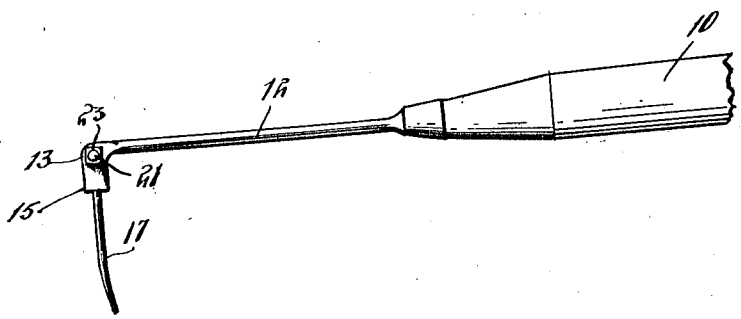
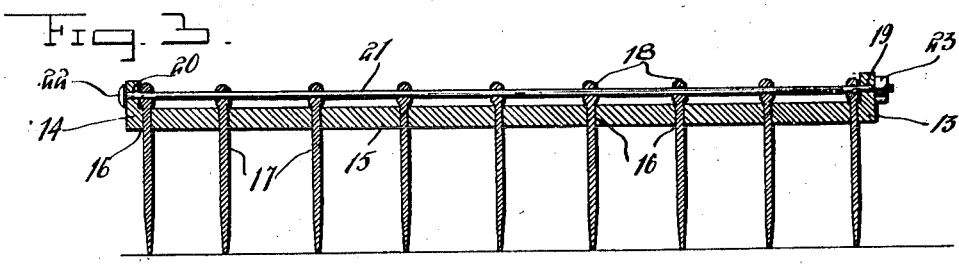
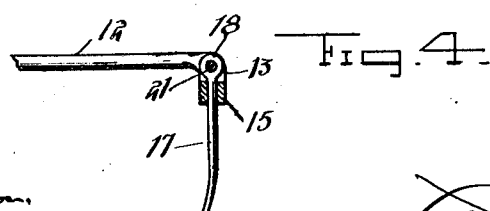
Witnesses
J. C. Simpson
Henry T. Bright
Inventor
L. E. Greene.
By Chandler & Chandler
Attorneys

UNITED STATES PATENT OFFICE.

LOUIS E. GREENE, OF CLEGHORN, IOWA.

RAKE.

1,020,387.  Specification of Letters Patent.  Patented Mar. 12, 1912.

Application filed December 21, 1911. Serial No. 667,144.

*To all whom it may concern:*

Be it known that I, LOUIS E. GREENE, a citizen of the United States, residing at Cleghorn, in the county of Cherokee, State of Iowa, have invented certain new and useful Improvements in Rakes; and I do hereby declare the following to be a full, clear, and exact description of the invention, such as will enable others skilled in the art to which it appertains to make and use the same.

This invention relates to rakes.

The object of the invention resides in the provision of a rake wherein the teeth are removably mounted in the cross head so that any or all of said teeth may be removed and replaced by new teeth when desired.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a plan view of the forward end of a rake constructed in accordance with the invention, Fig. 2, a side view of what is shown in Fig. 1, Fig. 3, a section on the line 3—3 of Fig. 1 and Fig. 4, a section on the line 4—4 of Fig. 1.

Referring to the drawings, the rake is shown as comprising a handle 10 which carries at one end diverging head supporting arms 11 and 12. The outer ends of these arms 11 and 12 are correspondingly bent at an angle as at 13 and 14 respectively. Suitably supported between the outermost portions of the bent ends 13 and 14 is the cross head 15 of the rake which is provided with a plurality of tooth receiving openings 16. Removably disposed in each of the openings 16 is a tooth 17 the upper end of which terminates in an eye 18. Formed in the bent ends 13 and 14 respectively and alining with the eyes 18 of the rake teeth are openings 19 and 20 and through these openings and through the eyes 18 of the teeth passes a locking bolt 21. One end of this bolt 21 is provided with a head 22 while the other end is threaded and has mounted thereon a nut 23. Through the medium of this bolt 21 the teeth 17 are securely locked to the head 15 as will be apparent. Should it be desired to replace a broken tooth it is only necessary to detach the nut 23 from the bolt 21 and then slide the latter transversely of the rake until it is removed from the eye of the broken tooth when the latter can be withdrawn from the opening in the head 15 and a new tooth inserted, after which the bolt 21 is reapplied in locking relation to the teeth and the nut 23 screwed thereon.

What is claimed is:

A rake comprising a handle, diverging head supporting arms secured to one end of said handle and having their outer ends correspondingly bent, a head supported between the bent ends of said arms and provided with a plurality of tooth receiving openings, teeth removably disposed in said openings respectively, eyes formed on the upper ends of said teeth, and a locking bolt removably inserted through the bent ends of said arms and through the eyes of said teeth.

In testimony whereof, I affix my signature, in presence of two witnesses.

LOUIS E. GREENE.

Witnesses:
LESLIE L. PATTON,
R. C. McKINNEY.